US011952985B2

United States Patent
Bosukonda et al.

(10) Patent No.: US 11,952,985 B2
(45) Date of Patent: Apr. 9, 2024

(54) METHOD FOR OPERATING A CLUSTER OF WIND TURBINES

(71) Applicant: VESTAS WIND SYSTEMS A/S, Aarhus N (DK)

(72) Inventors: Pradeep Bosukonda, Aarhus V (DK); Johnny Nielsen, Svenstrup J (DK); Tobias Rossel, Skødstrup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/326,978

(22) Filed: May 31, 2023

(65) Prior Publication Data
US 2023/0407849 A1    Dec. 21, 2023

(30) Foreign Application Priority Data
Jun. 16, 2022    (DK) .......................... PA 2022 70327

(51) Int. Cl.
*F03D 80/40*    (2016.01)
*F03D 7/02*    (2006.01)
(Continued)

(52) U.S. Cl.
CPC ........... *F03D 80/40* (2016.05); *F03D 7/0264* (2013.01); *F03D 7/048* (2013.01); *F03D 17/00* (2016.05);
(Continued)

(58) Field of Classification Search
CPC ...... F03D 80/40; F03D 80/401; F03D 80/405; F03D 7/048; F05B 2270/335
See application file for complete search history.

(56) References Cited

U.S. PATENT DOCUMENTS 6,975,925 B1 * 12/2005 Barnes .................... F03D 7/048
                                                                  700/286
8,712,593 B2 *  4/2014 Bjertrup .................. F03D 7/046
                                                                  290/55
(Continued)

FOREIGN PATENT DOCUMENTS

EP    2520794 A1 * 11/2012 ............. F03D 17/00
EP    2778404 A1    9/2014
(Continued)

OTHER PUBLICATIONS

Danish Patent and Trademark Office, 1st Technical Examination including The Search Report for Application PA 2022 70327 dated Dec. 9, 2022.
(Continued)

*Primary Examiner* — Sabbir Hasan
*Assistant Examiner* — Arthur Paul Golik
(74) *Attorney, Agent, or Firm* — Patterson + Sheridan, LLP

(57) ABSTRACT

A method for operating a cluster of a plurality of wind turbines is disclosed. For each of the wind turbines, one or more parameter values of a parameter being indicative for a condition occurring at the wind turbine are derived, based the measurements obtained by the wind turbine. In the case that a derived parameter value for a specific wind turbine exceeds a trigger value, measures for mitigating an effect of the condition at the specific wind turbine are initiated. The derived parameter values for the wind turbines of the cluster of wind turbines are compared to an expected distribution of the parameter values. In the case that a distribution of the derived parameter values differs from the expected distribution of the parameter values, the trigger value is adjusted, and the adjusted trigger value is subsequently applied when comparing the derived parameter values to the trigger value.

15 Claims, 9 Drawing Sheets

(51) Int. Cl.
    *F03D 7/04*    (2006.01)
    *F03D 17/00*   (2016.01)
(52) U.S. Cl.
    CPC ....... *F05B 2260/80* (2013.01); *F05B 2270/20* (2013.01)

(56) References Cited

U.S. PATENT DOCUMENTS

| | | |
|---|---|---|
| 10,557,459 B2 * | 2/2020 | Kjær .................. F03D 7/00 |
| 2011/0081226 A1 | 4/2011 | Wobben |
| 2011/0089692 A1 * | 4/2011 | Girardin ............ F03D 7/0264 290/44 |
| 2012/0185180 A1 | 7/2012 | Frederiksen |
| 2013/0106108 A1 * | 5/2013 | De Boer ............. F03D 7/045 290/44 |
| 2015/0292486 A1 | 10/2015 | Zhou et al. |
| 2016/0084224 A1 * | 3/2016 | Tyber ................. F03D 17/00 700/287 |
| 2020/0124032 A1 * | 4/2020 | Grunnet .............. F03D 80/40 |
| 2020/0309093 A1 * | 10/2020 | Lebosq ............... F03D 17/00 |
| 2022/0003210 A1 | 1/2022 | Bertelsen et al. |

FOREIGN PATENT DOCUMENTS

| | | | |
|---|---|---|---|
| EP | 3696405 A1 * | 8/2020 | ............ F03D 17/00 |
| WO | 2009016020 A1 | 2/2009 | |
| WO | 2020216424 A1 | 10/2020 | |

OTHER PUBLICATIONS

European Patent Office, extended European Search Report for Application 23176606.4-1002 dated Nov. 14, 2023.

* cited by examiner

METHOD FOR OPERATING A CLUSTER OF WIND TURBINES

FIELD OF THE INVENTION

The present invention relates to a method for operating a cluster of wind turbines, such as a plurality of wind turbines forming part of a wind farm. More particularly, the method according to the invention allows a condition occurring at the individual wind turbine to be detected with higher accuracy than prior art methods.

BACKGROUND OF THE INVENTION

Wind turbines are sometimes subjected to conditions which adversely affect the ability of the wind turbines to produce power and/or which introduces a risk of excessive loads or wear on the wind turbine, or even a risk of damage to the wind turbine. Such conditions include ice formation on the wind turbine blades, strong winds, sand storms, heavy rain, hail, high turbulence, gusty winds, etc. Furthermore, conditions may occur which causes adverse effects to nearby areas when the wind turbine operates, e.g. in terms of noise, shadows, etc., potentially to the extent that it is not possible to fulfil requirements or obligations towards neighbours.

When conditions of the kind described above occur, it is necessary to initiate measures in order to mitigate the condition, or at least one or more effects caused by the condition. However, such measures may involve reducing the power production of the wind turbine, energy consumption and/or introduce a risk of wear or damage to parts of the wind turbine, and it is therefore desirable to initiate such measures only if the condition is actually occurring.

Accordingly, it is desirable to be able to detect with high accuracy whether or not a relevant condition is occurring.

DESCRIPTION OF THE INVENTION

It is an object of embodiments of the invention to provide a method for operating a cluster of wind turbines in which the occurrence of a condition which requires measures to be initiated at one or more of the wind turbines can be detected with high accuracy.

It is a further object of embodiments of the invention to provide a method for operating a cluster of wind turbines in which protection of the wind turbines is ensured while maximising power production of the cluster of wind turbines.

The invention provides a method for operating a cluster of wind turbines, the cluster of wind turbines comprising a plurality of wind turbines, the method comprising the steps of:
   each of the wind turbines of the cluster of wind turbines obtaining one or more measurements related to the operation of the wind turbine,
   for each of the wind turbines, deriving one or more parameter values of a parameter being indicative for a condition occurring at the wind turbine, based on the measurements obtained by the wind turbine,
   comparing the derived parameter values for each wind turbine to a trigger value for triggering measures for mitigating an effect of the condition, based on the parameter, and
   in the case that a derived parameter value for a specific wind turbine exceeds the trigger value, initiating measures for mitigating an effect of the condition at the specific wind turbine,
   wherein the method further comprises the steps of:
   comparing the derived parameter values for the wind turbines of the cluster of wind turbines to an expected distribution of the parameter values, the expected distribution defining a mean value and a deviation, and
   in the case that a distribution of the derived parameter values differs from the expected distribution of the parameter values, adjusting the trigger value and subsequently applying the adjusted trigger value when comparing the derived parameter values to the trigger value.

Thus, the method according to the invention is a method for operating a cluster of wind turbines. In the present context the term 'cluster of wind turbines' should be interpreted to mean a plurality of wind turbines which are similar to each other and/or which are subjected to similar operating conditions. The wind turbines may, e.g., be positioned in the vicinity of each other, e.g. within the same wind farm.

In the method according to the invention, each of the wind turbines of the cluster of wind turbines obtains one or more measurements related to the operation of the wind turbines. The measurements could, e.g., be performed on the wind turbines, e.g. in the form of measurements of loads on one or more wind turbine components, deflections of one or more wind turbine components, vibrations of one or more wind turbine components, power production of the wind turbine, etc. Alternatively or additionally, the measurements may relate to operating conditions experienced by and/or being relevant for the wind turbines, e.g. in the form of wind conditions, precipitation, solar influx and direction, etc., occurring at the position of the wind turbine. In any event, the measurements are obtained by the individual wind turbines and relate to the operation of the individual wind turbines.

Next, for each of the wind turbines, one or more parameter values of a parameter being indicative for a condition occurring at the wind turbine is derived, based on the measurements obtained by the wind turbines. This may be performed by the wind turbines themselves, or it may be performed at a central unit or facility to which the wind turbines have communicated their measurements.

The parameter is indicative for a condition occurring at the wind turbine in the sense that the parameter is relevant with respect to determining whether or not it is likely that a specified condition is occurring at the wind turbine. Accordingly, the parameter is of a kind which can be relied upon when determining whether or not to initiate appropriate measures in order to handle a given condition at the wind turbine.

Furthermore, the parameter is related to the measurements performed by the wind turbines in the sense that parameter values of the parameter can be derived from the measured values. The parameter values may simply be identical to the measured values. Alternatively, it may be possible to calculate the parameter values from the measured values.

Next, the derived parameter values for each wind turbine are compared to a trigger value. The trigger value represents a threshold level for the parameter which is applied in order to determine whether or not a given condition is occurring at the wind turbine.

In the case that a derived parameter value for a specific wind turbine exceeds the trigger value, it is concluded that the condition is occurring at that wind turbine. Therefore, when this is the case, measures are initiated for mitigating an effect of the condition at that specific wind turbine. Accordingly, it is individually determined, for each of the wind turbines of the cluster of wind turbines, whether or not a given condition is occurring at that specific wind turbine, and thereby whether or not relevant measures should be initiated. Furthermore, this decision is based on measurements performed by the wind turbine itself.

In the present context the term 'exceeding the trigger value' should be interpreted to mean that the parameter value increases above or decreases below the trigger value, depending on the nature of the parameter.

In parallel to the process above, the derived parameter values for the wind turbines of the cluster of wind turbines are compared to an expected distribution of the parameter values. The expected distribution defines a mean value and a deviation, and it may, e.g., be a normal distribution.

The expected distribution may, e.g., be derived from measurements originating from a population of wind turbines, i.e. a plurality of wind turbines, under circumstances where it is known that a condition of interest is not occurring. The population of wind turbines may be the wind turbines of the cluster of wind turbines being operated in accordance with the present invention. Alternatively or additionally, other similar wind turbines may be used.

When a single wind turbine performs a measurement and a parameter value is derived therefrom, some uncertainty or measurement error will normally be introduced. Therefore, when the resulting parameter value serves as a basis for determining whether or not a certain condition is occurring at the wind turbine, and thereby as a basis for determining whether or not to initiate measures for mitigating an effect of the condition, a margin reflecting the expected measurement error may be applied, since it is not possible to determine whether a given measurement is near the correct value, near a lower boundary of the error margin or near an upper boundary of the error margin. Therefore, it may be difficult to determine whether a derived parameter value which exceeds the trigger value is in fact indicative for the occurrence of the condition.

However, if parameter values originating from a plurality of wind turbines are considered, these can be expected to follow a certain distribution. Thus, if the derived parameter values originating from the plurality of wind turbines of the cluster of wind turbines follow an expected distribution, then it is highly likely that derived parameter values which are very high or very low are in fact near a lower or an upper boundary of the error margin. Accordingly, in this case a trigger value which is provided under the assumption that the parameter values follow the expected distribution may be assumed to be appropriate, i.e. the trigger value may be considered as correctly reflecting a boundary between when to initiate measures for mitigating an effect of the condition and when not to initiate such measures.

On the other hand, in the case that the distribution of derived parameter values differs from the expected distribution of the parameter values, then a very high or a very low derived parameter value may in fact be near the mean value of the true distribution of the parameter values, rather than near an upper or a lower boundary of the error margin. Accordingly, in this case a trigger value which is provided under the assumption that the parameter values follow the expected distribution will most likely not correctly reflect a boundary between when to initiate measures for mitigating an effect of the condition and when not to initiate such measures. Accordingly, if such a trigger value is applied in this case, there is a risk that the condition may actually be occurring at wind turbines for which the derived parameter value does not exceed the trigger value, or that the condition may not be occurring even if the trigger value is exceeded, depending on how the distribution of derived parameter values differs from the expected distribution. Accordingly, when this is the case, the trigger value is adjusted in order to compensate for this, and thereby more accurately reflect the correct boundary between when the condition is occurring and when it is not.

Subsequently, the adjusted trigger value is applied during the step of comparing the derived parameter values for each wind turbine to the trigger value.

Accordingly, it is still determined individually for each wind turbine whether or not to initiate measures for mitigating an effect of an occurring condition, based on measurements performed by the individual wind turbines. However, the trigger value applied for performing this decision is adjusted based on measurements originating from a plurality of wind turbines, and on statistical considerations.

Thereby it is ensured that a decision regarding whether or not to initiate measures for mitigating an effect of an occurring condition can be made with high accuracy. Accordingly, it is ensured that such measures are initiated when they are required, but not when they are not required. This further ensures appropriate protection of the wind turbines as well as optimal power production of the cluster of wind turbines.

The parameter being indicative for a condition occurring at the wind turbine may be or comprise a rotor efficiency loss of the wind turbine.

In the present context the term 'rotor efficiency loss' should be interpreted to mean a difference between the actual performance of the wind turbine and an expected, theoretical maximum performance under the given operating conditions. Thus, the rotor efficiency loss may represent a reduction in power production of the wind turbine, as compared to a maximum possible power production under the operating conditions which are currently prevailing at the position of the wind turbine, e.g. in terms of wind speed, wind direction, etc. Alternatively or additionally, the rotor efficiency loss may represent a reduction in rotor efficiency in other ways than the power production, e.g. in terms of pitch angle required to maintain a specific power production, increased loads, etc. This may, e.g., be relevant in the case that the wind turbine is operated at a derated power production, or if the wind turbine is operating within the nominal power range.

Rotor efficiency loss may be caused by a variety of different causes. For instance, the wind turbine may be arranged in the wake of other wind turbines, terrain structures, vegetation, etc. As another example, a yaw error which causes the wind turbine rotor to be positioned off with respect to the wind direction may cause rotor efficiency loss. However, rotor efficiency loss may also be caused by ice formation on the wind turbine blades or other fouling of the wind turbine blades. In this case a rotor efficiency loss above a certain trigger level may trigger initiation of heating of the wind turbine blades, in order to remove ice from the wind turbine blades, or ordering service for the wind turbine, in order to clean the wind turbine blades.

Since rotor efficiency loss may be caused by various causes, as described above, a certain distribution of rotor efficiency loss must be expected throughout a cluster of wind turbines. Therefore, rotor efficiency loss is a suitable parameter when performing the method according to the invention.

The condition occurring at the wind turbine may be ice formation at one or more wind turbine blades.

Ice formation at the wind turbine blades increases the weight of the rotor and adversely affects the aerodynamic properties of the wind turbine blades. Ice formation at the wind turbine blades therefore reduces the power production of the wind turbine, and may also give rise to uneven loads on the wind turbine. It is therefore desirable to remove such ice formation, and to be able to accurately determine whether or not ice formation is occurring.

In the case that the condition occurring at the wind turbine is ice formation at one or more of the wind turbine blades, the step of initiating measures for mitigating an effect of the condition may comprise initiating heating of the wind turbine blades of the specific wind turbine.

Heating the wind turbine blades will cause any ice formed on the wind turbine blades to melt. Accordingly, this is an appropriate measure for mitigating ice formation. The heating may, e.g., be performed by means of electrical heating elements arranged in the wind turbine blades.

Heating the wind turbine blades when there is in fact no ice formation on the wind turbine blades may have an adverse impact on the wind turbine blades. For instance, glue or resin forming part of the wind turbine blades may be damaged or partly resolved, and this may cause weakening of the wind turbine blades. Furthermore, this represents an unnecessary energy consumption. Accordingly, in this case it is very relevant to be able to determine whether or not ice formation on the wind turbine blades is actually present with high accuracy, thereby allowing heating of the wind turbine blades to be initiated immediately when ice formation is occurring, while avoiding to initiate heating when there is no ice formation on the wind turbine blades.

As an alternative, the occurrence of other kinds of conditions may be detected. For instance, the condition may be heavy rain, in which case the parameter may be measurements originating from a rain sensor. Alternatively, the condition may be hail, in which case the parameter may be measurements from a sensor measuring a force impact from hails hitting the sensor. As another alternative, the condition may be shadow formation at a nearby location, in which case the parameter may be a difference in solar influx in two opposite directions.

The step of initiating measures for mitigating an effect of the condition may comprise derating the wind turbine and/or pausing the wind turbine and/or reducing a rotor speed of the wind turbine. Such measures may, e.g., be relevant in order to protect the wind turbine, e.g. in the case that the condition occurring is heavy rain, hail, gusty wind conditions, turbulent wind conditions, ice formation on the wind turbine blades, etc. Furthermore, it may be relevant to stop or pause the wind turbine in the case that the condition occurring is shadow formation, in order to avoid inappropriate shadows at nearby structures or locations.

The steps of obtaining one or more measurements, deriving one or more parameter values, and comparing the derived parameter values to an expected distribution may be performed substantially continuously. According to this embodiment, the trigger value is continuously adjusted, based on statistical considerations regarding the measurements performed by the plurality of wind turbines of the cluster of wind turbines. Thereby it is continuously ensured that the applied trigger value correctly reflects the boundary between when the conditions is occurring and when the condition is not occurring.

The method may further comprise the step of deriving parameter values of one or more further parameters for the wind turbines of the cluster of wind turbines, and the one or more further derived parameter values may be taken into account for deciding whether or not to initiate measures for mitigating an effect of the condition.

According to this embodiment, the decision regarding whether or not a given condition is occurring is not taken based on one single parameter. Instead, one or more further relevant parameters are taken into account. For instance, in the case that the condition is ice formation on the wind turbine blades, the ambient temperature may be measured, e.g. in addition to deriving the rotor efficiency loss. In the case that the ambient temperature is below or near 0° C., then it is more likely that a certain rotor efficiency loss is caused by ice formation on the wind turbine blades than if the ambient temperature is well above 0° C.

Alternatively or additionally, parameter values related to loads on the wind turbine and/or eigenfrequencies of the wind turbine may be derived. For instance, a change in loads on the wind turbine and/or a change in one or more eigenfrequencies of the wind turbine may be an indication that something is affecting the operation of the wind turbine. For instance, ice formation on the wind turbine blades may cause an increase in the loads on certain parts of the wind turbine, e.g. the wind turbine blades, the hub, the drive train and/or the tower. Furthermore, ice formation on the wind turbine blades may change the structure of the wind turbine to the extent that one or more eigenfrequencies change.

The step of comparing the derived parameter values for the wind turbines of the cluster of wind turbines to an expected distribution of the parameter values may comprise the steps of:

deriving a distribution of the derived parameter values for the wind turbines of the cluster, and deriving a mean of the derived distribution, and comparing the mean of the derived distribution to the mean of the expected distribution of the parameter values, and the step of adjusting the trigger value may be performed on the basis of a difference between the mean of the derived distribution and the mean of the expected distribution.

For instance, if the mean of the derived distribution is shifted relative to the mean of the expected distribution by a certain amount, then the trigger value may be adjusted by the same or a similar amount, or by a certain percentage of the amount.

The cluster of wind turbines may form part of a wind farm. For instance, the cluster of wind turbines may include all wind turbines of a wind farm, or a subset of the wind turbines of a wind farm. Alternatively or additionally, the cluster of wind turbines may be formed by wind turbines which are similar to each other, e.g. in terms of expected operating conditions, type of wind turbine, etc.

BRIEF DESCRIPTION OF THE DRAWINGS

The invention will now be described in further detail with reference to the accompanying drawings in which.

DETAILED DESCRIPTION OF THE DRAWINGS

Figure 1:
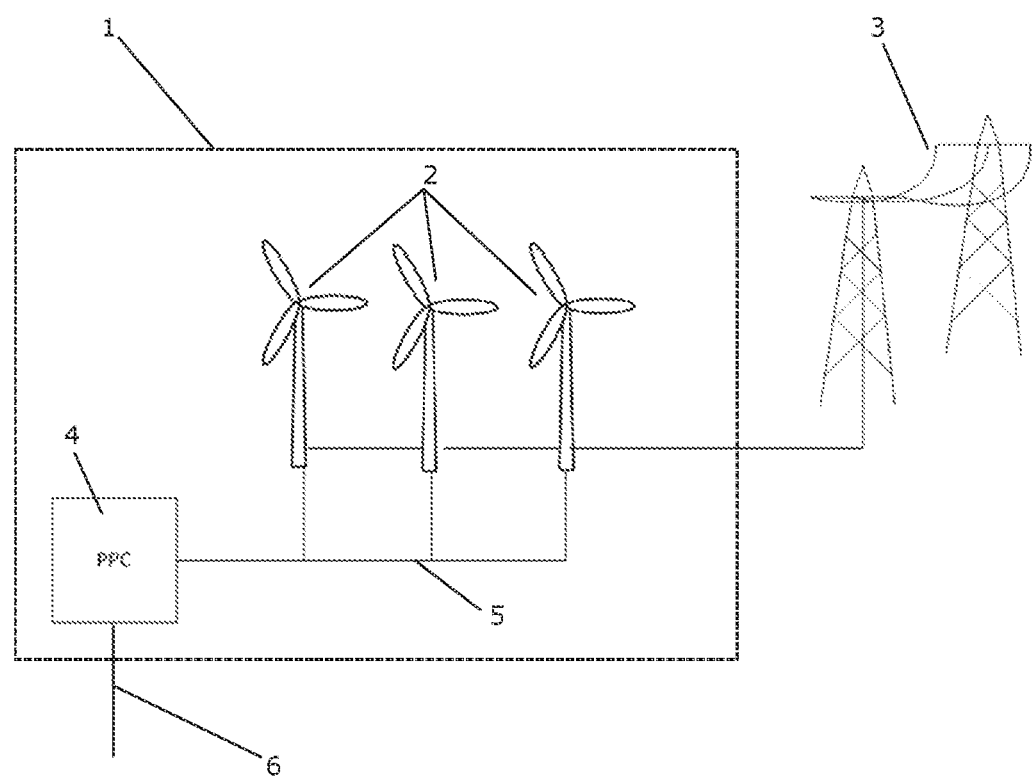
FIG. 1 shows a cluster of wind turbines being controlled in accordance with a method according to an embodiment of the invention.

FIG. 1 shows a cluster 1 of wind turbines 2 in the form of a plurality of wind turbines 2, three of which are shown, forming part of a wind farm. The wind turbines 2 extract energy from the wind and generate electrical power, which is supplied to a power grid 3.

During operation, each of the wind turbines 2 obtains various measurements being relevant with regard to the operation of the individual wind turbine 2. Such measurements may include measurements of power produced by the wind turbine 2, measurements by various load sensors, measurements related to wind conditions, such as wind speed, wind direction, turbulence condition, etc., measurements related to other weather conditions, such as precipitation, air density, solar influx, etc., and/or any other suitable kind of measurements which may be required in order to ensure appropriate operation of the wind turbine 2.

The wind turbines 2 apply the obtained measurements for their own control. Furthermore, the measurements may be supplied to a central power plant controller (PPC) 4, via a communication connection 5. The PPC 4 may apply the received measurements for handling overall control of the wind farm, e.g. in order to ensure that obligations towards the power grid 3 are met. The PPC 4 may further communicate control signals to the wind turbines 2 via the communication connection 5. Finally, the PPC 4 may be able to handle communication outside the wind farm via external communication connection 6. This may, e.g., include communicating data from the wind turbines 2 to a data centre, e.g. for statistical and/or monitoring purposes, and/or receiving control commands related to the wind farm.

When operating the cluster 1 of wind turbines 2, the measurements obtained by the wind turbines 2 are applied for deriving one or more parameter values of a parameter being indicative for a condition occurring at the respective wind turbines 2. This may, e.g., be done by the wind turbines 2 themselves, by the PPC 4, or by an external data centre.

For each wind turbine 2, the derived parameter values are compared to a trigger value for triggering measures for mitigating an effect of the condition. The trigger value is a value of the parameter which is appropriate for distinguishing between a situation where the condition is likely occurring and a situation where the condition is likely not occurring. Thus, in the case that the derived parameter value for a specific wind turbine 2 exceeds the trigger value, it can be concluded that it is likely that the condition is occurring at that wind turbine 2. Therefore, when this is the case, measures are initiated for mitigating an effect of the condition at that specific wind turbine 2.

Furthermore, the derived parameter values for the wind turbines 2 of the cluster 1 of wind turbines 2 are compared to an expected distribution of the parameter values. In the case that a distribution of the derived parameter value differs from the expected distribution, this is an indication that there might be general conditions which affect the parameter. Therefore, the trigger value being applied may not be appropriate under the prevailing operating conditions. Accordingly, when this is the case, the trigger value is adjusted in order to compensate for the discrepancy. Subsequently, the adjusted trigger value is applied during control of the wind turbines 2. Thereby it can be established with higher accuracy whether or not a specific condition is occurring at the wind turbines 2, and it is ensured with higher certainty that relevant measures are initiated if the condition is in fact occurring, as well as that no measures are initiated if the condition is not occurring.

Figure 2:
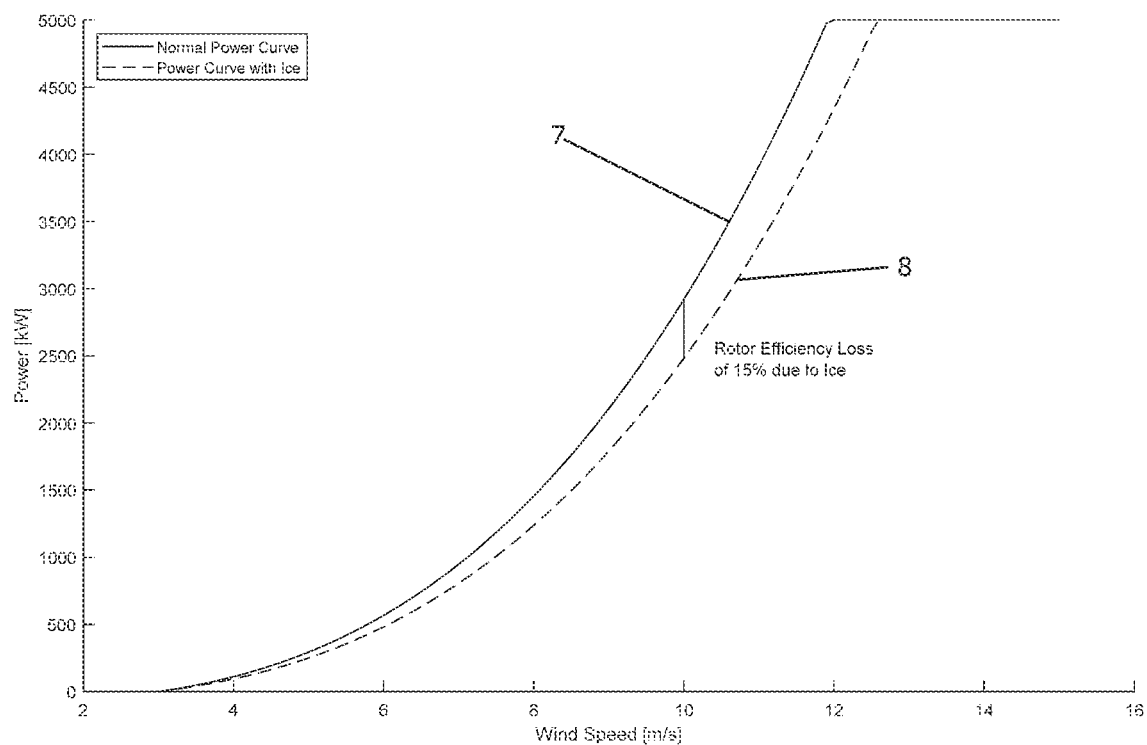
FIG. 2 is a graph illustrating rotor efficiency loss of a wind turbine.

FIG. 2 is a graph illustrating rotor efficiency loss for a wind turbine. Solid curve 7 represents a normal power curve for the wind turbine, i.e. normal power production of the wind turbine as a function of wind speed, and thereby the maximum power production which may be expected from the wind turbine at the specified wind speed.

The dashed curve 8 represents a similar power curve for the wind turbine in a scenario where there is ice formation on the wind turbine blades of the wind turbine.

It can be seen that the power production of the wind turbine with ice formation on the wind turbine blades, represented by dashed curve 8, is lower than the normal power production of the wind turbine, represented by solid curve 7, in the partial load region, i.e. below the nominal power. The difference between the normal power production 7 and the power production 8 of the wind turbine with ice formation on the wind turbine blades is referred to as rotor efficiency loss. In the graph of FIG. 2, the rotor efficiency loss is caused solely by ice formation on the wind turbine blades. It should, however, be noted that rotor efficiency loss may, alternatively or additionally, be caused by other causes.

FIGS. 3-9 are graphs illustrating a method according to an embodiment of the invention related to ice formation on the wind turbine blades.

Figure 3:
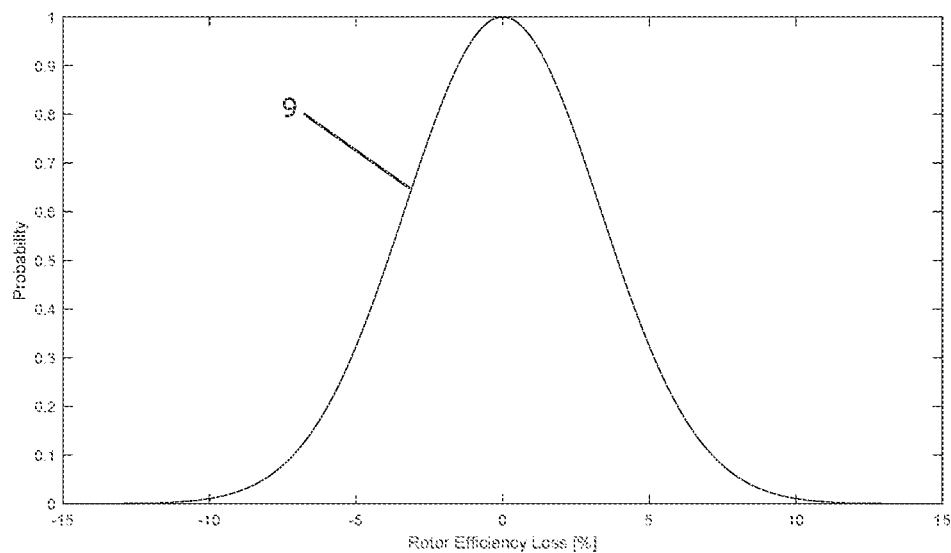
FIGS. 3-9 are graphs illustrating a method according to an embodiment of the invention related to ice formation on the wind turbine blades.

FIG. 3 is a graph illustrating an expected distribution 9 of rotor efficiency loss of a plurality of wind turbines forming a cluster of wind turbines, when there is no ice formation on the wind turbine blades of the wind turbines. More particularly, the graph of FIG. 3 illustrates normalised probability density of the cluster of wind turbines as a function of rotor efficiency loss. The distribution 9 is a normal distribution defining a mean of 0. Thus, on average the wind turbines are expected to deliver maximum power production under the given operating conditions, corresponding to no, i.e. zero, rotor efficiency loss. However, some of the wind turbines are expected have a slightly higher power production and some of the wind turbines are expected to have a slightly lower power production, as illustrated by the distribution 9 of FIG. 3. This may, e.g., be caused by differences in wake conditions, yaw errors, inaccuracy in measurements, etc., among the wind turbines. It can be seen that most of the wind turbines of the cluster of wind turbines are expected to detect a rotor efficiency loss which is within ±10% of the expected power production.

Figure 4:
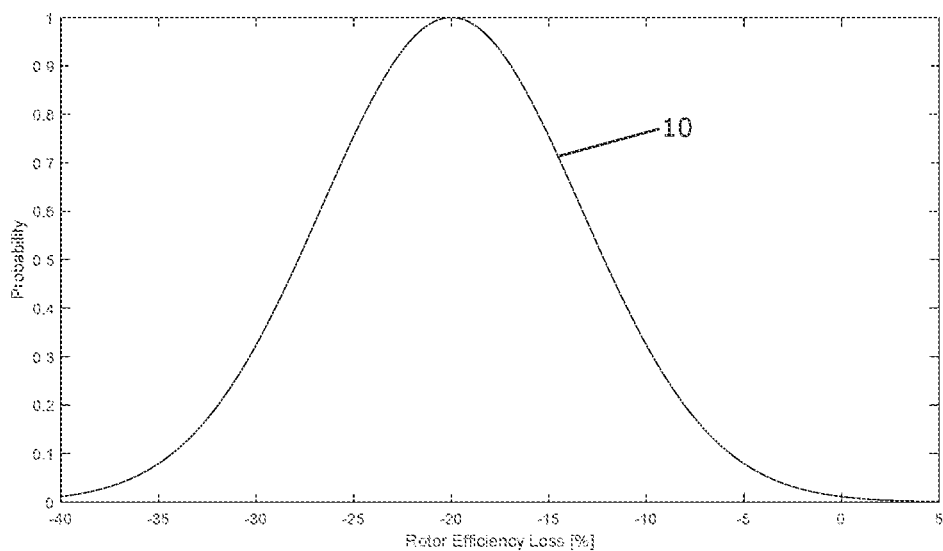

FIG. 4 is a graph illustrating a distribution 10 of rotor efficiency loss of a cluster of wind turbines corresponding to the cluster of wind turbines illustrated in FIG. 3. Similarly to FIG. 3, the graph of FIG. 4 illustrates normalised probability density of the cluster of wind turbines as a function of rotor efficiency loss. However, in FIG. 4 there is ice formation on the wind turbine blades of the wind turbines. Similarly to FIG. 3, the distribution 10 illustrated in FIG. 4 is also a normal distribution. However, in this case the distribution 10 defines a mean of approximately −20%. Accordingly, on average the wind turbines of the cluster of wind turbines detect a rotor efficiency loss of approximately −20% of the expected power production, i.e. a power production which is approximately 20% below the maximum possible power production under the given circumstances.

Figure 5:
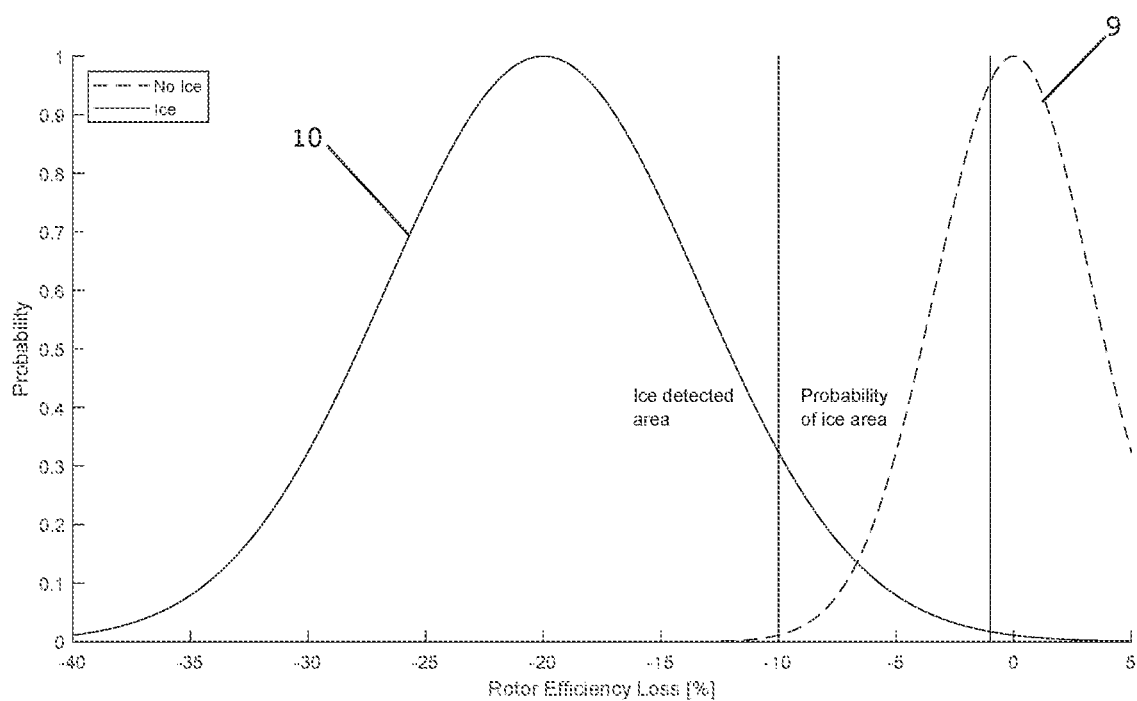

FIG. 5 illustrates the expected distribution 9 of rotor efficiency loss, without ice formation, of FIG. 3, and the distribution 10 of rotor efficiency loss, with ice formation, of FIG. 4. It is clear from FIG. 5 that the wind turbines with ice formation on the wind turbine blades, corresponding to distribution 10, have a significantly lower power production than the wind turbines without ice formation on the wind turbine blades, corresponding to distribution 9.

Thus, if there is in fact ice formation on the wind turbine blades of a wind turbine, it is desirable to remove this ice, in order to reduce the rotor efficiency loss caused by the ice formation, i.e. in order to increase the power production of the wind turbine. This is often done by heating the wind turbine blades, thereby melting the ice. However, if the wind turbine blades are heated when there is in fact no ice formation on the wind turbine blades, this may cause damage to the wind turbine blades, e.g. due to glue or resin forming part of the wind turbine blades being damaged or partly resolved. In addition, this represents an unnecessary energy consumption. Therefore, it is desirable to be able to determine whether or not there is ice formation on the wind turbine blades of a wind turbine, and apply this determination for triggering heating of the wind turbine blades.

It can be seen that, if a wind turbine detects a rotor efficiency loss of −10% or lower, it is significantly more likely that there is ice formation on the wind turbine blades of the wind turbine, corresponding to the wind turbine following distribution 10, than that there is no ice formation on the wind turbine blades, corresponding to the wind turbine following expected distribution 9.

It can also be seen that, if a wind turbine detects a rotor efficiency loss of −1% or higher, it is significantly more likely that there is no ice formation on the wind turbine blades of the wind turbine, corresponding to the wind turbine following expected distribution 9, than that there is ice formation on the wind turbine blades, corresponding to the wind turbine following distribution 10.

However, if a wind turbine detects a rotor efficiency loss within the region between −10% and −1%, it is difficult to determine whether the wind turbine follows distribution 9 or distribution 10, i.e. whether or not this is an indication that there is ice formation on the wind turbine blades.

In order to ensure with high certainty that heating of the wind turbine blades is not initiated when there is no ice formation on the wind turbine blades, a trigger value of −10% rotor efficiency loss may be selected. This will result in very few wind turbines without ice formation on the wind turbine blades being categorised as having ice formation on the wind turbine blades, corresponding to the part of distribution 9 being below −10%. Thereby the risk of causing damage to the wind turbine blades, due to heating, is very small. Furthermore, this will result in most of the wind turbines which actually have ice formation on the wind turbine blades being categorised as such, corresponding to the part of distribution 10 being below −10%.

However, selecting −10% rotor efficiency loss as the trigger value for initiating heating of the wind turbine blades will have the consequence that a significant number of wind turbines which actually have ice formation on the wind turbine blades will not be categorised as such, corresponding to the part of distribution 10 being above −10%. For these wind turbines, heating will not be initiated, and they will continue operating with a reduced power output.

Figure 6:
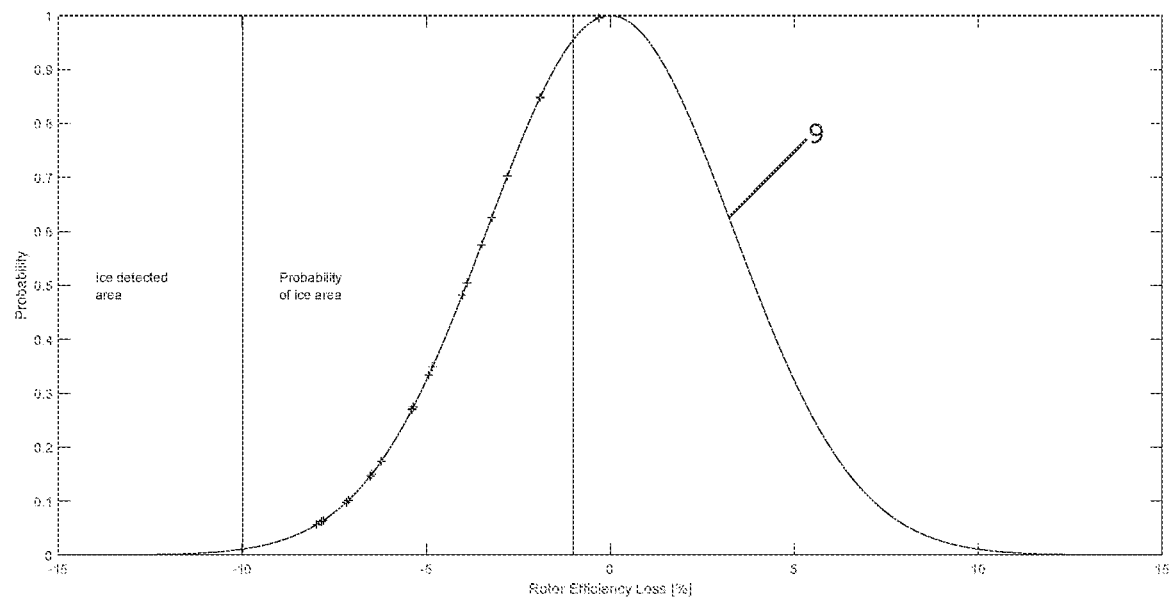

FIG. 6 is a graph showing the expected distribution 9 of rotor efficiency loss, without ice formation, of FIG. 3. Furthermore, derived rotor efficiency loss values for a plurality of wind turbines forming part of a cluster of wind turbines are plotted as discrete points marked by '+'. It is noted that the marked points only represent derived rotor efficiency loss values for individual wind turbines, i.e. the points do not reflect normalised probability density for the derived values. The points have been plotted on the expected distribution 9 in order to allow for easy comparison between the derived rotor efficiency loss values and the expected distribution 9, as will be described in further detail below.

It can be seen that the derived rotor efficiency loss values are all below the mean value of the expected distribution 9, i.e. below 0%. If the derived rotor efficiency loss values had followed the expected distribution 9, derived values should have been present along the entire curve 9. Accordingly, it can be concluded that the derived rotor efficiency loss values are not following the expected distribution 9. Therefore, if a trigger value for initiating heating of the wind turbine blades is selected based on the assumption that the rotor efficiencies of the wind turbines are distributed as expected, then there is a significant risk that wind turbines which actually have ice formation on the wind turbine blades are not identified. This will lead to the power production of these wind turbines being lower than the optimal or maximum power production under the given operating conditions.

Thus, by comparing the derived rotor efficiency losses for the wind turbines to the expected distribution 9 of rotor efficiency losses, it can be seen that a trigger value of −10% rotor efficiency loss for initiating heating of the wind turbine blades is not appropriate. In fact, none of the wind turbines would trigger heating of the wind turbine blades, since they all detect a rotor efficiency loss which is above −10%. Yet, the low derived values indicate that there might be ice formation on the wind turbine blades of at least some of the wind turbines.

Figure 7:
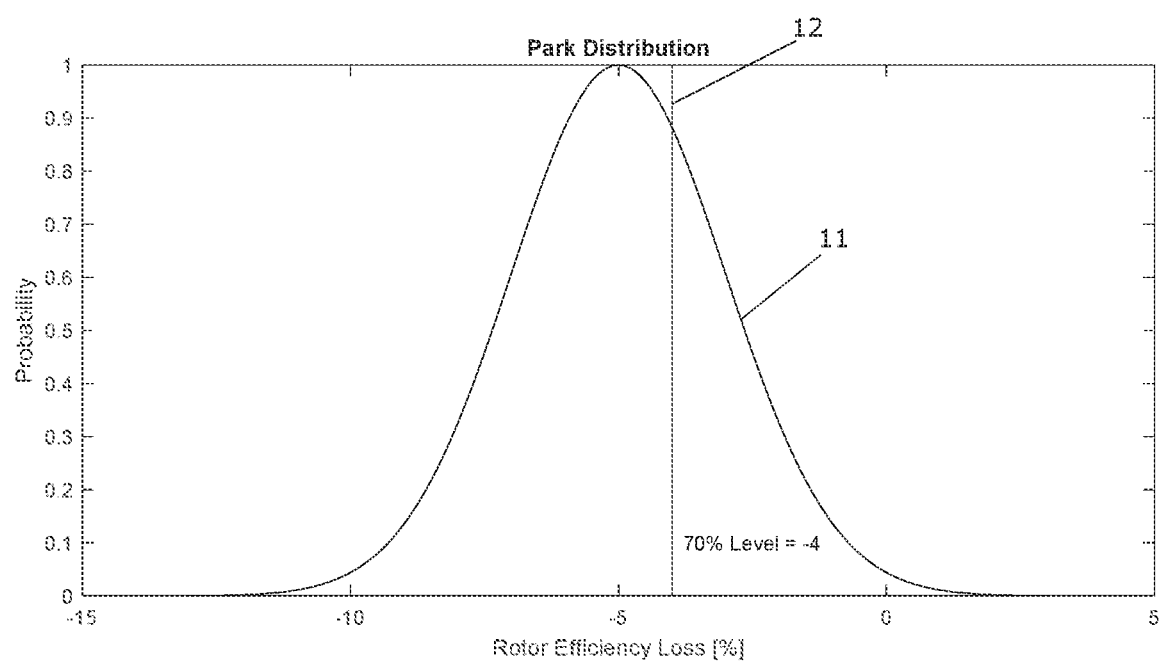

FIG. 7 is a graph illustrating the actual distribution 11 of the derived rotor efficiency losses of the wind turbines, which were plotted in FIG. 6, in the form of normalised probability density as a function of rotor efficiency loss, derived from the values illustrated in FIG. 6. It can be seen that the distribution 11 is a normal distribution defining a mean value of approximately −5%. Thus, on average the wind turbines detect a power production which is approximately 5% lower than the maximum power production under the given operating conditions.

Based on the actual distribution 11, a value of the rotor efficiency loss is now selected in such a manner that 70% of the wind turbines detect a rotor efficiency loss below that value, indicated by line 12. It can be seen that this value is approximately −4%. The value 12 is now used for adjusting the trigger value in order to define a more suitable boundary for distinguishing between wind turbines with ice formation on the wind turbine blades and wind turbines without ice formation on the wind turbine blades. This will be described in further detail below with reference to FIG. 8.

Figure 8:
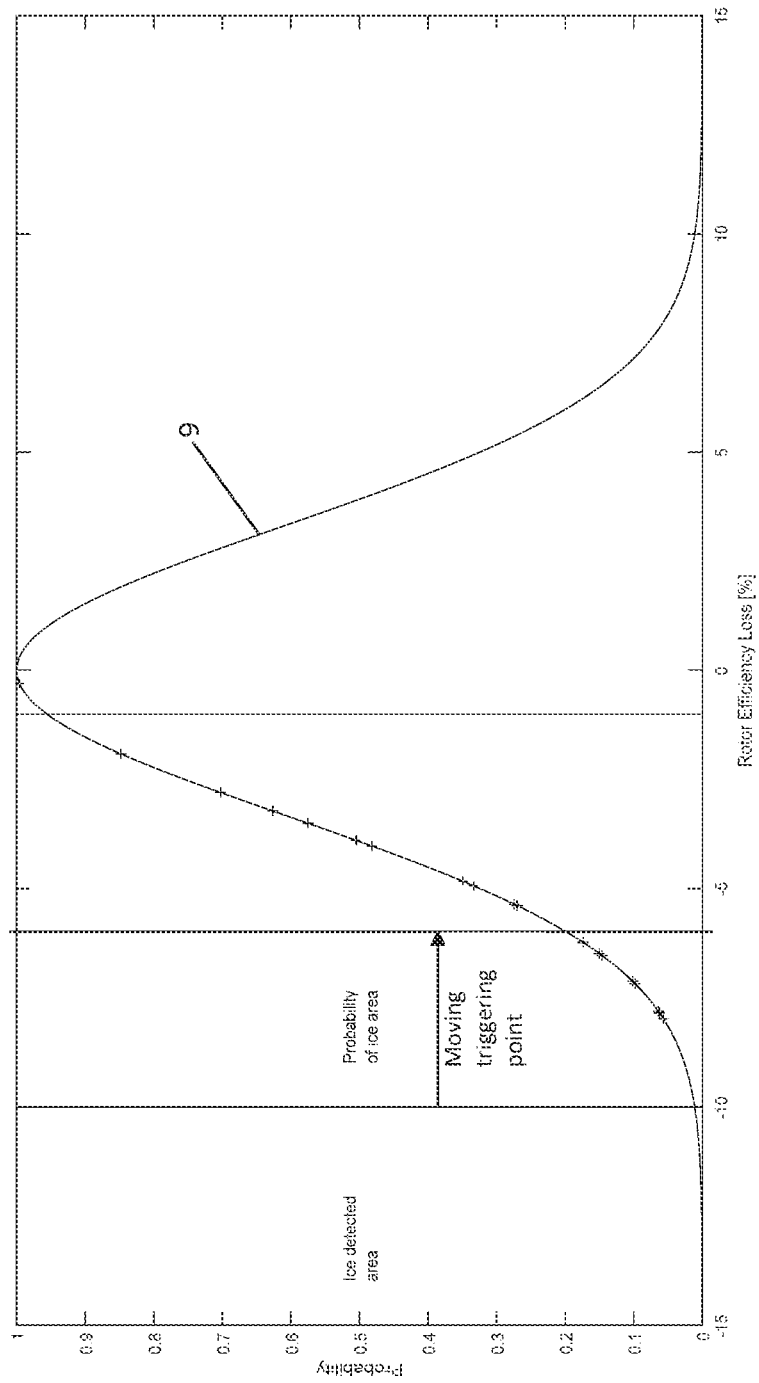

FIG. 8 is a graph illustrating the expected distribution 9 and the rotor efficiency losses derived by the wind turbines, which were also illustrated in FIG. 6. Based on the actual distribution 11, illustrated in FIG. 7, and the selected value 12, the trigger value is adjusted by an amount corresponding to the selected value 12, i.e. 4%, from −10% to −6%. It can be seen that this has the consequence that some of the wind turbines detect a rotor efficiency loss which is below the adjusted trigger value, i.e. below −6%, and these wind turbines will therefore initiate heating of their wind turbine blades. Accordingly, the new trigger value strikes a better balance between ensuring that ice formation is removed and preventing heating of wind turbine blades without ice formation. Accordingly, the total power production of the cluster of wind turbines can be increased without risking damage to the wind turbine blades of the wind turbines.

Figure 9:
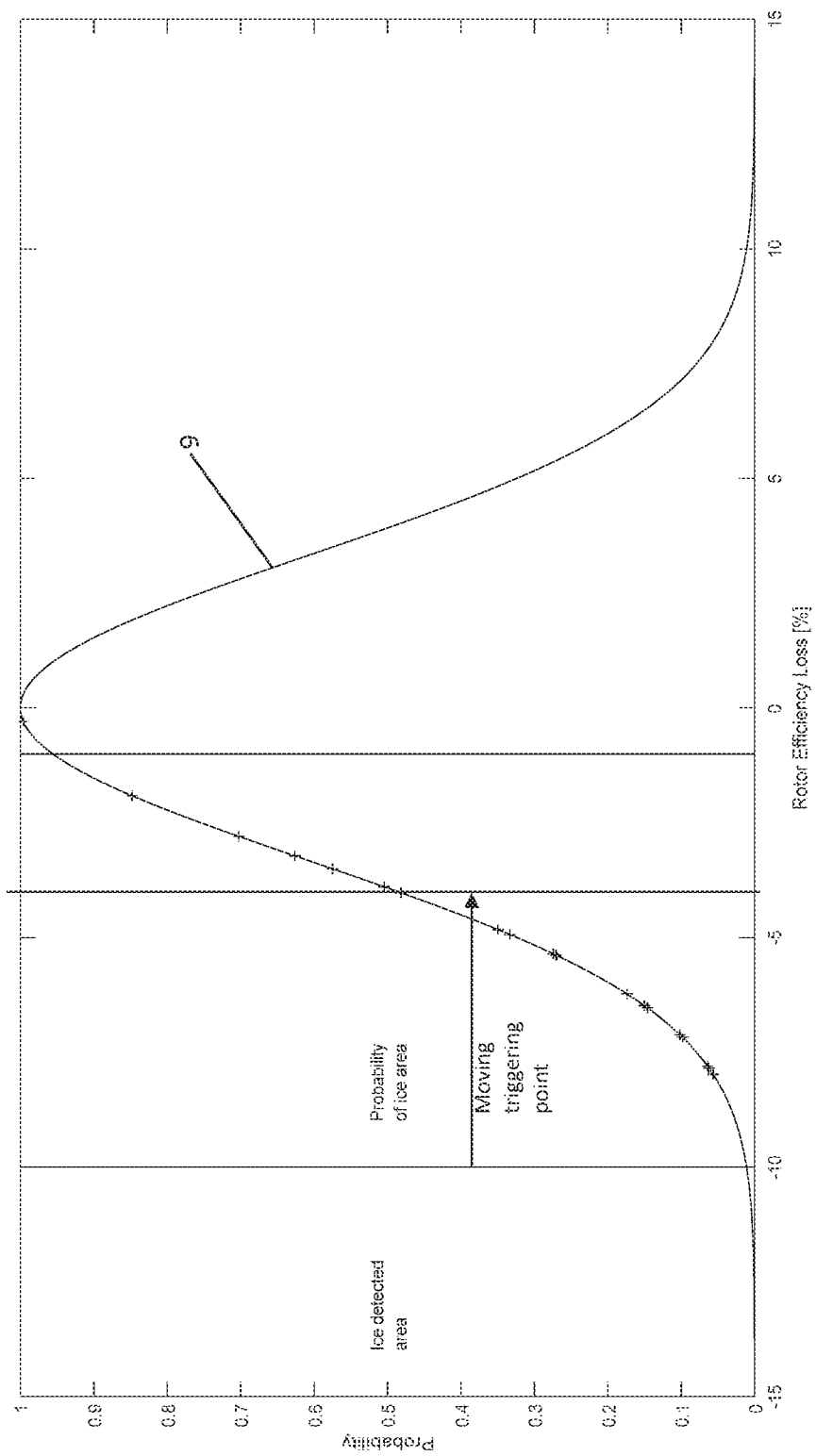

FIG. 9 is a graph illustrating the expected distribution 9 and derived rotor efficiency losses, similar to FIG. 8. However, in the graph of FIG. 9, the trigger value has been adjusted more, i.e. to a higher value, than is the case in FIG. 8. More particularly, in the situation illustrated in FIG. 9, a value of the rotor efficiency loss is selected, based on the actual distribution of the derived rotor efficiency losses, essentially in the manner described above with reference to FIG. 7. However, in this case the value is selected in such a manner that 30% of the wind turbines detect a rotor efficiency loss below the value. Referring to FIG. 7, this value is approximately −6%. Therefore, in the situation illustrated in FIG. 9, the trigger value is adjusted by 6%, from −10% to −4%. It can be seen that this has the consequence that even more wind turbines detect a rotor efficiency loss below the adjusted trigger value, causing these wind turbines to initiate heating of their wind turbine blades.

Referring to FIGS. 8 and 9, FIG. 8 represents a more conservative approach than FIG. 9, i.e. FIG. 9 represents a more aggressive approach than FIG. 8. Selecting a very conservative approach provides a low risk of initiating heating of wind turbine blades without ice formation, while accepting that some wind turbines with ice formation on the wind turbine blades will not initiate heating of their wind turbine blades. Similarly, selecting a very aggressive approach provides a low risk of failing to heat wind turbine blades with ice formation, while accepting that some wind turbine blades without ice formation will be heated.

If the cluster of wind turbines comprises few wind turbines, it may be appropriate to select a conservative approach. On the other hand, if the cluster of wind turbines comprises many wind turbines, the statistical foundation is better, and a more aggressive approach may therefore be selected without unduly increasing the risk of heating wind turbine blades without ice formation. Alternatively or additionally, selecting a conservative or aggressive approach may also be based on a deviation of the distribution of the derived rotor efficiency losses. For instance, a conservative approach may be selected if the deviation is large, and an aggressive approach may be selected if the deviation is small.

Figure 10:
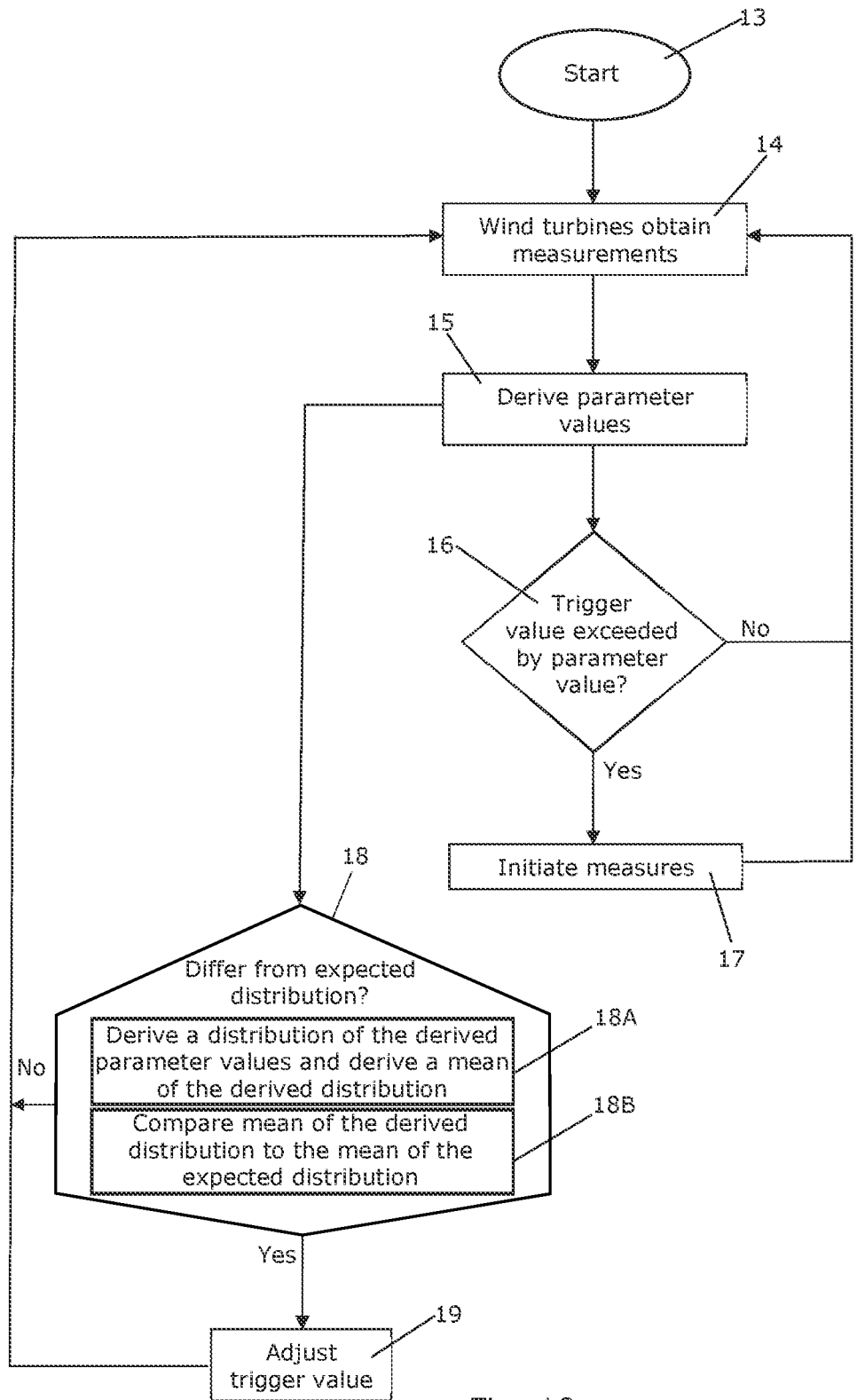
FIG. 10 is a flow chart illustrating a method according to an embodiment of the invention.

FIG. 10 is a flow chart illustrating a method according to an embodiment of the invention. The process is started at step 13. At step 14 the wind turbines of a wind turbine cluster each obtains measurements related to the operation of the wind turbine.

At step 15, parameter values are derived for each of the wind turbines, based on the measurements obtained at step 14. The parameter values are values of a parameter which is indicative for a condition occurring at the wind turbine.

At step 16, the derived parameter values are compared to a trigger value for triggering measures for mitigating an effect of the condition, based on the parameter. In the case that step 16 reveals that the derived parameter value for one of the wind turbines exceeds the trigger value, it is concluded that the condition is occurring at that wind turbine. Therefore, when this is the case, the process is forwarded to step 17, where measures are initiated for that wind turbine, in order to mitigate an effect of the condition.

On the other hand, in the case that step 16 reveals that the derived parameter value for a given wind turbine does not exceed the trigger value, then it is concluded that the condition is not occurring at that wind turbine, and the process is returned to step 14 for continued measurements.

Furthermore, at step 18, the parameter values derived at step 15 are compared to an expected distribution of the parameter values. In the case that the derived parameter values follow the expected distribution, i.e. if they do not differ from the expected distribution, it is concluded that the trigger value which is applied in step 16 is appropriate, and the process is returned to step 14.

One the other hand, in the case that step 18 reveals that the derived parameter values differ from the expected distribution, then the trigger value applied in step 16 is adjusted in accordance with the difference. Subsequently the adjusted trigger value is applied when performing step 16.

In some implementations, at step 18, comparing the derived parameter values for the wind turbines of the cluster of wind turbines to an expected distribution of the parameter values may include step 18A, which includes deriving a distribution of the derived parameter values for the wind turbines of the cluster, and deriving a mean of the derived distribution, and step 18B, which includes comparing the mean of the derived distribution to the mean of the expected distribution of the parameter values. In such implementations, the step of adjusting the trigger value at step 19 may be performed on the basis of a difference between the mean of the derived distribution and the mean of the expected distribution.

The invention claimed is:

1. A method for operating a cluster of wind turbines, the cluster of wind turbines comprising a plurality of wind turbines, the method comprising steps of:
    each wind turbine of the cluster of wind turbines respectively obtaining one or more measurements related to operation thereof,
    for each wind turbine of the cluster of wind turbines, deriving one or more parameter values of a parameter being indicative for a condition occurring at a given wind turbine of the cluster of wind turbines, based on the one or more measurements,
    comparing the derived one or more parameter values for each wind turbine of the cluster of wind turbines to a trigger value for triggering measures for mitigating an effect of the condition, based on the parameter, and
    in a case that one of the derived one or more parameter values for a specific wind turbine of the cluster of wind turbines exceeds the trigger value, initiating the measures for mitigating the effect of the condition at the specific wind turbine,
wherein the method further comprises steps of:
    comparing the derived one or more parameter values for each wind turbine of the cluster of wind turbines to an expected distribution, the expected distribution defining a mean value and a deviation, and
    in a case that a distribution of the derived one or more parameter values differs from the expected distribution, adjusting the trigger value and subsequently applying the adjusted trigger value when comparing the derived one or more parameter values to the trigger value.

2. The method according to claim 1, wherein the parameter is or comprises a rotor efficiency loss of the specific wind turbine.

3. The method according to claim 1, wherein the condition is ice formation at one or more wind turbine blades.

4. The method according to claim 3, wherein the step of initiating the measures for mitigating the effect of the condition comprises initiating heating of the one or more wind turbine blades of the specific wind turbine.

5. The method according to claim 1, wherein the step of initiating the measures for mitigating the effect of the condition comprises derating the specific wind turbine and/or pausing the specific wind turbine and/or reducing a rotor speed of the specific wind turbine.

6. The method according to claim 1, wherein the steps of obtaining the one or more measurements, deriving the one or more parameter values, and comparing the derived one or more parameter values to the expected distribution are performed continuously.

7. The method according to claim 1, further comprising a step of deriving parameter values of one or more further parameters for each wind turbine of the cluster of wind turbines, and wherein the one or more further parameters are taken into account for deciding whether or not to initiate the measures for mitigating the effect of the condition.

8. The method according to claim 1, wherein the step of comparing the derived one or more parameter values for each wind turbine of the cluster of wind turbines to the expected distribution comprises steps of:
   deriving the distribution of the derived one or more parameter values for each wind turbine of the cluster of wind turbines, and deriving a mean of the derived distribution, and
   comparing the mean of the derived distribution to the mean of the expected distribution,
   and wherein the step of adjusting the trigger value is performed on a basis of a difference between the mean of the derived distribution and the mean of the expected distribution.

9. The method according to claim 8, wherein when the mean of the derived distribution is shifted relative to the mean of the expected distribution by a predefined amount, the trigger value is adjusted by a same amount or a predetermined amount.

10. The method according to claim 8, wherein when the mean of the derived distribution is shifted relative to the mean of the expected distribution by a predefined amount, the trigger value is adjusted by a predefined percentage of the predefined amount.

11. The method according to claim 1, wherein the cluster of wind turbines forms part of a wind farm.

12. The method according to claim 1, wherein the expected distribution is derived from measurements originating from the plurality of wind turbines taken under circumstances where the condition is known not to be occurring.

13. A system, comprising:
   a cluster of wind turbines, the cluster of wind turbines comprising a plurality of wind turbines; and
   a controller being arranged to:
      obtain, from each wind turbine of the cluster of wind turbines, one or more measurements related to operation thereof;
      derive, for each wind turbine of the cluster of wind turbines, one or more parameter values of a parameter being indicative for a condition occurring at a given wind turbine of the cluster of wind turbines, based on the one or more measurements;
      compare the derived one or more parameter values for each wind turbine of the cluster of wind turbines to a trigger value for triggering measures for mitigating an effect of the condition, based on the parameter, and
      in a case that one of the derived one or more parameter values for a specific wind turbine of the cluster of wind turbines exceeds the trigger value, initiate the measures for mitigating the effect of the condition at the specific wind turbine, and
   wherein the controller is further arranged to:
      derive a distribution of the derived one or more parameter values for each wind turbine of the cluster of wind turbines, and deriving a mean of the derived distribution;
      compare the mean of the derived distribution to a mean of an expected distribution; and
      adjust the trigger value and subsequently applying the adjusted trigger value when comparing the derived one or more parameter values to the trigger value, and wherein the trigger value is adjusted on a basis of a difference between the mean of the derived distribution and the mean of the expected distribution.

14. The system according to claim 13, wherein when the mean of the derived distribution is shifted relative to the mean of the expected distribution by a predefined amount, the controller is arranged to adjust the trigger value by a same amount or a predetermined amount.

15. The system according to claim 13, wherein when the mean of the derived distribution is shifted relative to the mean of the expected distribution by a predefined amount, the controller is arranged to adjust the trigger value by a predefined percentage of the predefined amount.

* * * * *